Patented Oct. 25, 1932

1,884,337

UNITED STATES PATENT OFFICE

CYRIL J. STAUD, OF ROCHESTER, NEW YORK, ASSIGNOR TO EASTMAN KODAK COMPANY, OF ROCHESTER, NEW YORK, A CORPORATION OF NEW YORK

CELLULOSIC COMPOSITION OF MATTER CONTAINING DIETHYL PHTHALATE AND ORTHO-CRESYL PARA-TOLUENE SULPHONATE

No Drawing.   Application filed November 14, 1930.   Serial No. 495,793.

This invention relates to compositions of matter in which cellulose derivatives, such as cellulose acetate, cellulose nitrate, or cellulose ether, are combined or mixed with other substances, such as a compatible plasticizer, and a common solvent for both, with or without other useful addition agents, so that the resulting product will have properties such as will make the composition highly advantageous for use in the plastic and analogous arts, such, for instance, as the manufacture of wrapping sheets, phothographic film, artificial silk, varnishes or lacquers, and the like.

One object of this invention is to produce a composition of matter which may be made into permanently transparent, strong and flexible sheets or films of desired thinness which are substantially waterproof, are unaffected by ordinary photographic fluids and possess the desired properties of a support for sensitive photographic coatings. Another object of our invention is to produce a composition which is capable of easy and convenient manipulation in the plastic and analogous arts, such as in the manufacture of sheets, films, artificial silk filaments, varnishes, lacquers and the like, and to produce a composition which will not injure, or be injured by, the substances or surfaces with which it is associated during manufacture or use. Another object of my invention is to produce a composition containing a mixed plasticizer which in addition to other things, fits film made therefrom to certain special uses.

It is also an object of my invention to produce a coating composition such as a lacquer which will adhere unusually well to metal, such as wire. A further object is to produce a composition which utilizes cellulose acetate of higher acetyl value.

Other objects will become apparent to those skilled in the art to which this invention pertains.

While cellulose acetates, nitrates and ethers have been known for decades it has also been known that to utilize them in the various plastic arts it is necessary to mix therewith such plasticizing or conditioning agents as camphor, castor oil, triphenyl phosphate, monochlornaphthalene or the like. Certain of those and other addition agents are also added for the purpose of reducing the inflammability of the product. Plastic inducing agents, such as the higher alcohols and their esters, are sometimes also added. Similarly, addition compounds of various kinds have been employed to increase flexibility, transparency, toughness and other properties which will enhance the valve of the resulting product. Addition products for the same or similar purposes are also added to cellulose acetates, nitrates and ethers to prepare them for use in the other plastic arts, such as in the manufacture of lacquers, varnishes, artificial silk filaments, moulded compounds and the like. While the plasticizers or other addition agents heretofore discovered have had their utility in the art, the increasing number of desirable properties required of the cellulose derivative for most purposes has made the discovery of new and economical plasticizers or other addition agents a matter of considerable importance to the art.

Ortho-cresyl para-toluene suphonate is described and claimed in Carroll Patent 1,560,542, as a useful plasticizer, particularly for cellulose acetate compositions and is valuable as such in most instances, but does not give as great flexibility as might be desired to a film or other composition of matter composed of cellulose acetate having the higher acetyl values such as from about 41% to 44.8% acetyl which it is desirable to employ for the reason that such acetate has better water resistance than acetate of lower acetyl values.

I have found, however, that by adding a quantity of diethyl phthalate (or other lower alkyl ester of phthalic acid such as methyl, propyl, butyl or amyl phthalate) to a cellulose acetate composition such as used for the production of film, lacquer or artificial silk, and particularly one containing cellulose acetate of a higher acetyl value, that a very flexible product is obtained (much more so than where ortho-cresyl para-toluene sulphonate is the only plasticizer employed) and, furthermore, that a fluid composition so produced, such as a lacquer, will adhere exceptionally well to metal, such as when used to coat or protect wire or wire netting. Thus by my invention I have produced a film or coating of good water resistance and a fluid composition of good adhering properties.

In order that those skilled in this art may better understand my invention I would state, by way of illustration, that for the manufacture of photographic film or other sheets my new composition of matter may be compounded as follows: 100 parts of acetone soluble cellulose acetate i. e. cellulose acetate containing about 41% to 42% acetyl radical, approximately, is dissolved with stirring at atmospheric temperature in approximately 500 parts of acetone containing a mixture of about 10 to 50 parts of diethyl phthalate and about 15 parts of ortho-cresyl para-toluene sulphonate. The amount of mixed plasticizer, or each of the components thereof, may be decreased or increased, depending upon whether it is desired to decrease or increase, respectively the properties which this mixed plasticizer or its components contributes to the finished product. The amount of solvent employed may also be decreased or increased, depending upon whether it is desired to have a more or less freely flowing composition, respectively.

A composition of matter prepared as above described may be deposited upon any suitable film forming surface to form a film or sheet, as is well known to those skilled in the art. A film so produced has permanently brilliant transparency and low inflammability, burning no more readily than ordinary newsprint. Such film is tough and flexible, as shown by the fact that it will withstand many folds upon a modified Schopper fold-tester (commonly used for such purposes) without breaking and that even after being subjected for a considerable number of days to air maintained at a temperature of 65° C. the film still maintains flexibility (in contrast to almost complete lack of flexibility where no plasticizer is used) demonstrating that the film will withstand ordinary usage satisfactorily for a considerable period. The sum total of the above advantageous properties of a product produced from my new composition is considerably in excess of that of products with what have previously been regarded as the better plasticizers.

Other similar solvents (instead of acetone) which are compatible with the cellulose acetate and our new plasticizer may also occur to those skilled in this art. In like manner this plasticizer may be compounded with other single organic esters of cellulose, such as cellulose propionate, butyrate and the like, or with mixed organic and/or inorganic esters, such as cellulose aceto-stearate, acetomalate, or cellulose nitro-acetate, or with the cellulose ethers, a suitable solvent which will dissolve both the cellulosic derivative and the plasticizer being employed.

Inasmuch as my above described composition of matter is quite useful in the production of films and sheets it will be apparent that our new plasticizer may also be employed with advantage in the other branches of the plastic art. For instance, my above described composition of matter may be employed in the manufacture of artificial silk by the dry spinning method. With the proper coagulating bath it may also be employed for wet spinning. It may be desired to employ a composition of different viscosity or evaporation characteristics but this is a mere matter of changing the solvent proportion or adding evaporation retardents or other high or intermediate boiling constituents, as has been well known in the art for more than a decade. My novel plasticizer may also be employed with advantage as above described in connection with a number of the known lacquer and varnish formulæ with which it may be found to be compatible. In such cases the plasticizer is usually first put into solution with the cellulose derivative solution and if non-solvents are added for the purpose of cheapening the composition they are added only to such an extent as will not precipitate the derivative from solution. Other uses within the scope of our invention will also suggest themselves to those skilled in the art and are to be included within the scope of the claims appended hereto.

What I claim as my invention, and desire to be secured by Letters Patent of the United States, is:

1. A composition of matter containing a cellulose derivative and a mixed plasticizer comprising ortho-cresyl para-toluene sulphonate and diethyl phthalate.

2. A composition of matter containing cellulose acetate and a mixed plasticizer comprising ortho-cresyl para-toluene sulphonate and diethyl phthalate.

3. A composition of matter containing cellulose acetate and a mixed plasticizer comprising ortho-cresyl para-toluene sulphonate and diethyl phthalate in the ratio by weight of approximately 3 to 10.

4. A composition of matter containing 100 parts cellulose acetate and from about 10 to 50 parts of diethyl phthalate and about 15 parts of ortho-cresyl para-toluene sulphonate.

5. A composition of matter containing cellulose acetate which has an acetyl content of from 40% to 44.8% and a mixed plasticizer comprising ortho-cresyl para-toluene sulphonate and diethyl phthalate.

6. A composition of matter containing cellulose acetate which has an acetyl content of from 40% to 44.8% and a mixed plasticizer comprising ortho-cresyl para-toluene sulphonate and a diethyl phthalate in the ratio by weight of approximately 3 to 10.

7. A composition of matter containing 100 parts cellulose acetate which has an acetyl content of from 40% to 44.8% and from about 10 to 50 parts of diethyl phthalate and about 15 parts of ortho-cresyl para-toluene sulphonate.

Signed at Rochester, N. Y., this 10th day of November, 1930.

CYRIL J. STAUD.